(12) United States Patent
Han

(10) Patent No.: US 11,202,975 B2
(45) Date of Patent: Dec. 21, 2021

(54) FLAT FILTER FOR WATER TREATMENT, AND FILTER MODULE FOR WATER TREATMENT USING SAME

(71) Applicant: AMOGREENTECH CO., LTD., Gyeonggi-do (KR)

(72) Inventor: Kyung Gu Han, Gyeonggi-du (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 67 days.

(21) Appl. No.: 16/780,193

(22) Filed: Feb. 3, 2020

(65) Prior Publication Data
US 2020/0171413 A1 Jun. 4, 2020

Related U.S. Application Data

(62) Division of application No. 15/757,046, filed as application No. PCT/KR2016/009850 on Sep. 2, 2016, now Pat. No. 10,589,195.

(30) Foreign Application Priority Data

Sep. 2, 2015 (KR) .......................... 10-2015-0124486

(51) Int. Cl.
*B01D 29/05* (2006.01)
*B01D 63/08* (2006.01)
(Continued)

(52) U.S. Cl.
CPC ............ *B01D 29/05* (2013.01); *B01D 29/52* (2013.01); *B01D 29/92* (2013.01); *B01D 61/18* (2013.01);
(Continued)

(58) Field of Classification Search
CPC ...... B01D 29/05; B01D 63/082; B01D 61/18; B01D 29/52; B01D 29/92;
(Continued)

(56) References Cited

U.S. PATENT DOCUMENTS

2010/0096317 A1\* 4/2010 Morita ................... B01D 71/36
210/321.84

FOREIGN PATENT DOCUMENTS

JP 2005-205382 A 8/2005
KR 10-0621483 B1 9/2006
(Continued)

OTHER PUBLICATIONS

International Search Report issued in Application No. PCT/KR2016/009850, dated Jan. 5, 2017.

*Primary Examiner* — Madeline Gonzalez
(74) *Attorney, Agent, or Firm* — Michael Best & Friedrich LLP

(57) ABSTRACT

A flat filter for water treatment is provided. The flat filter for water treatment according to one embodiment of the present invention comprises: filtration members formed in the shape of a plate having a predetermined area; support frames, which are coupled to the rim sides of the filtration members so as to support the filtration members, and have channels into/in which filtered water produced through the filtration members flows and moves; and gap adjustment members coupled to the support frames so as to adjust the gap between the filtration members adjacent to one another.

14 Claims, 14 Drawing Sheets

(51) Int. Cl.
  *B01D 29/92* (2006.01)
  *B01D 29/52* (2006.01)
  *B01D 61/18* (2006.01)
  *C02F 1/44* (2006.01)
  *C02F 1/00* (2006.01)

(52) U.S. Cl.
  CPC ............ *B01D 63/082* (2013.01); *C02F 1/004* (2013.01); *C02F 1/44* (2013.01); *B01D 2201/0415* (2013.01); *B01D 2201/0423* (2013.01); *B01D 2313/025* (2013.01); *B01D 2315/06* (2013.01); *C02F 2201/002* (2013.01)

(58) Field of Classification Search
  CPC ........ B01D 2201/0423; B01D 2315/06; B01D 2313/025; B01D 2201/0415; B01D 29/44; B01D 29/46; B01D 25/12; B01D 25/164; B01D 25/21; C02F 1/44; C02F 1/004; C02F 2201/002
  USPC ....... 210/346, 224, 225, 227, 228, 230, 231, 210/486, 461
  See application file for complete search history.

(56) References Cited

FOREIGN PATENT DOCUMENTS

| | | |
|---|---|---|
| KR | 10-2011-0139692 A | 11/2011 |
| KR | 10-2012-0020333 A | 3/2012 |
| KR | 10-2014-0103866 A | 8/2014 |
| KR | 10-0459037 B1 | 11/2014 |

\* cited by examiner

FLAT FILTER FOR WATER TREATMENT, AND FILTER MODULE FOR WATER TREATMENT USING SAME

CROSS REFERENCE TO RELATED APPLICATIONS

This application is a divisional of U.S. application Ser. No. 15/757,046, filed on Mar. 2, 2018, which is a the national phase entry of International Application No. PCT/KR2016/009850, filed on Sep. 2, 2016, which is based upon and claims priority to Korean Patent Applications 10-2015-0124486, filed on Sep. 2, 2015, the entire contents of which are incorporated herein by reference.

TECHNICAL FIELD

The present invention relates to a flat filter for water treatment and a filter module for water treatment using the same.

BACKGROUND

The amount of wastewater discharged from domestic spaces and industrial facilities is increasing due to rapid industrial development and urban population concentration. Accordingly, various wastewater treatment facilities are being developed to economically and efficiently treat wastewater.

Generally, a wastewater treatment facility is provided with a plurality of filters, including a filtration member for filtering wastewater, and contaminants removed from wastewater remain on the surface of the filtration member by which wastewater is filtered.

Accordingly, to remove contaminants present on the surface of the filtration member, a method of forcibly introducing clean water into the filter and removing contaminants attached to the filtration member to reuse the filtration member is used.

In the case of such a contaminant removal method, to remove contaminant attached to the filtration member, it is necessary to secure a drop space between the filters so that contaminants removed from the filtration member can fall without hindrance.

In this regard, it is necessary that the plurality of filters are appropriately spaced apart from each other in the installation process. However, in a conventional case, since the gap between the filters is adjusted and fixed by eye by an operator during the assembly process, there may be problems, in that a gap between the filters may not be precise and an operation time may be elongated.

In addition, in a case in which filters cannot have proper spacing by handwork, there is a problem in that the drop space for contaminants removed from the filtration member may not be sufficiently secured, whereby efficient removal of contaminants may not be possible and filtration efficiency may be decreased.

SUMMARY OF THE INVENTION

The present invention is directed to providing a flat filter for water treatment that can easily allow a gap between adjacent filters to be adjusted in an assembly process and a filter module for water treatment using the same.

According to an embodiment of the present invention, there is provided a flat filter for water treatment including a plate-shaped filtration member having a predetermined area, a support frame coupled to peripheral portions of the filtration member to support the filtration member, the support frame having channels through which filtered water produced by the filtration member flows, and a gap adjustment member coupled to the support frame to adjust a gap between the filtration member and an adjacent filtration member.

In addition, the gap adjusting member may include a water-receiving portion configured to discharge the filtered water from the channels to the outside.

In addition, the gap adjustment member may include a body into which a corner of the support frame is inserted, and a gap adjusting portion including a fastening hole through which a fastening bar having a predetermined length passes.

In addition, the gap adjusting portion may include an extension plate extending from the body and having the fastening hole, and a spacing member protruding around the fastening hole to a predetermined height to adjust the gap between the filtration member and an adjacent filtration member.

In addition, the support frame may include a plurality of frames coupled to the peripheral portions of the filtration member, wherein each of the plurality of frames may include a first plate, a pair of second plates extending from both ends of the first plate such that the peripheral portions of the filtration member are inserted, and stopper provided on opposite surfaces of the pair of the second plates to limit an insertion depth by which the filtration member is inserted.

In addition, the plurality of frames may be disposed such that one end of one frame among the plurality of frames is in contact with a corresponding end of an adjacent frame among the plurality of frames, and a collection space is provided in a corner of the support frame formed by the adjacent ends, wherein flows of filtered water flowing in different directions through the channels join in the collection space, and the collection space may communicate with the water-receiving portion configured to discharge the filtered water to the outside.

In addition, the gap adjustment member may be coupled to a corner of the support frame such that both ends of a pair of adjacent frames among the plurality of frames of the support frame may be fixed.

In addition, the filtration member may include a plate-shaped first backing, and a nanofiber web made of nanofiber, disposed on both surface of the first backing.

In addition, the nanofiber web may be attached to one surface of the first backing by thermal fusion through a second backing.

In addition, the nanofiber web may have a melting temperature higher than a process temperature of a thermal fusion, and the second backing may have a lower melting temperature than the process temperature of the thermal fusion.

In addition, each of the first backing and the second backing may be a woven fabric or a nonwoven fabric, and the first backing and the second backing may be made of a same material.

In addition, a thickness of the second backing may be smaller than a thickness of the first backing.

Meanwhile, according to another embodiment of the present invention, there is provided a filter module for water treatment including a filter assembly including a plurality of filters described above integrated through a fastening bar, and at least one collecting member connected in one-to-one relationship to the water-receiving portions provided in the plurality of filters to collect filtered water discharged from the plurality of filters.

In addition, the collecting member may include a main body storing the filtered water introduced from the water-receiving portion, a plurality of inlets configured to introduce the filtered water discharged from the water-receiving portions into the main body, and at least one outlet configured to discharge the filtered water from the main body to the outside.

In addition, the collecting member may be spaced apart from the water-receiving portions of the plurality of the filters at predetermined gaps, and the plurality of the inlets are connected in one-to-one relationship to the respective water-receiving portions through tubes.

In addition, the water-receiving portions of the plurality of the filters may be directly inserted into the inlets of the collecting member.

According to the present invention, the gap between adjacent filters is uniformly maintained by the gap adjustment member, thereby facilitating assembly and increasing filtration efficiency.

DETAILED DESCRIPTION OF THE INVENTION

Figure 1:
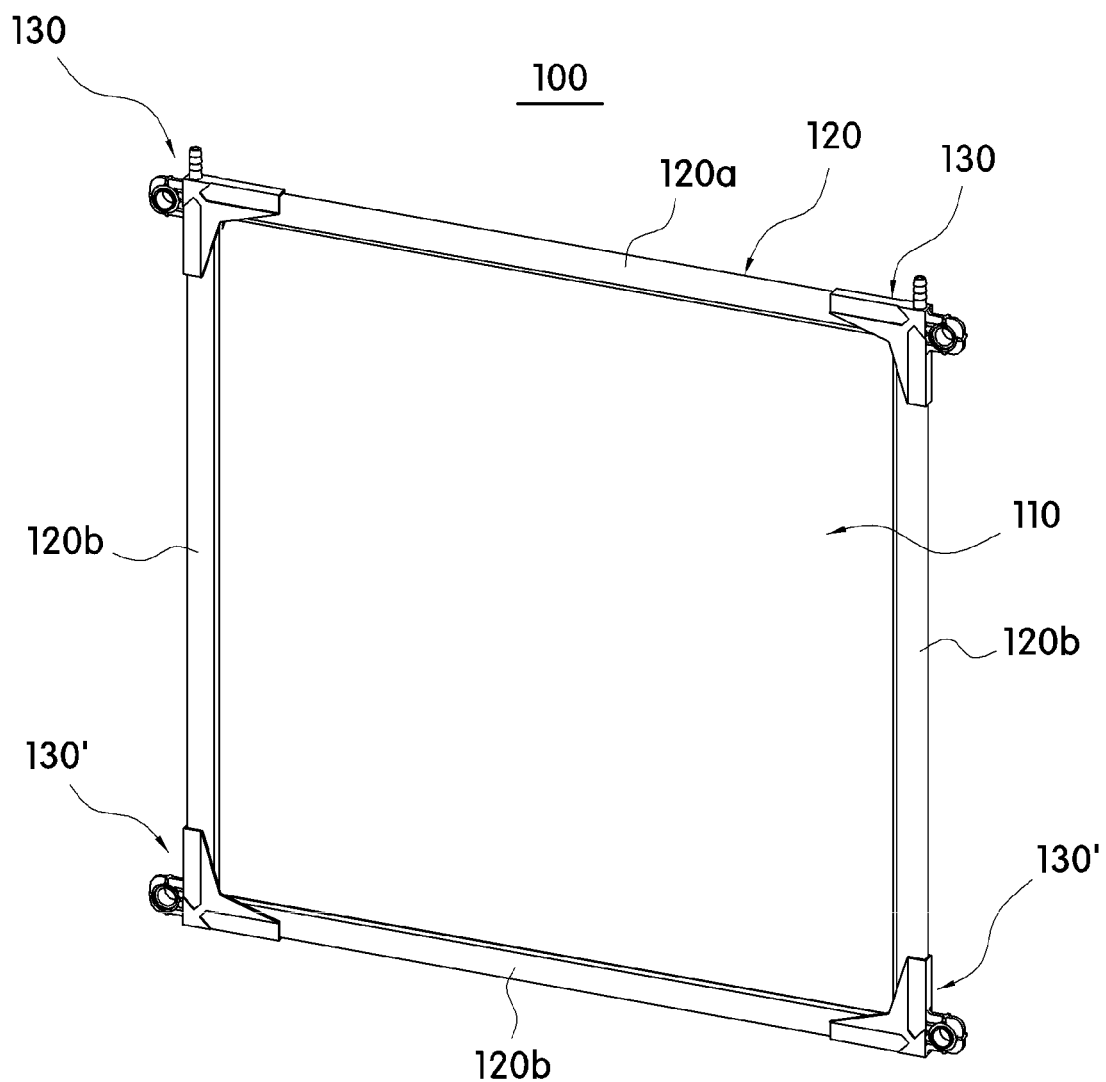
FIG. 1 is a view illustrating a flat filter for water treatment according to an embodiment of the present invention.

Hereinafter, embodiments of the present disclosure will be described in detail with reference to the accompanying drawings so that those skilled in the art can easily carry out the present disclosure. The present disclosure may be embodied in various manners and is not limited to the embodiments described herein. In the drawings, parts not relating to the description may be omitted for clarifying the present disclosure, and the same reference numerals may be assigned to the same or similar components throughout the specification.

As illustrated in FIG. 1, a flat filter (or planar filter) 100 for water treatment according to an embodiment of the present invention includes a filtration member 110, a support frame 120, and gap adjustment members 130 and 130'.

The filtration member 110 is used to filter impurities contained in liquid to be filtered such as sewage or wastewater. The filtration member 110 may be a known filtration member or may be a plate-shaped member including nanofiber webs 112 disposed on both surfaces of a first backing 111.

In this case, the nanofiber webs 112 serve to filter impurities contained in liquid to be filtered while the liquid to be filtered is passing therethrough by suction pressure. The first backing 111 may support the nanofiber webs 112 and may serve as a path along which the filtered water (or filtrate) produced by the nanofiber webs 112 flows.

Figure 2:
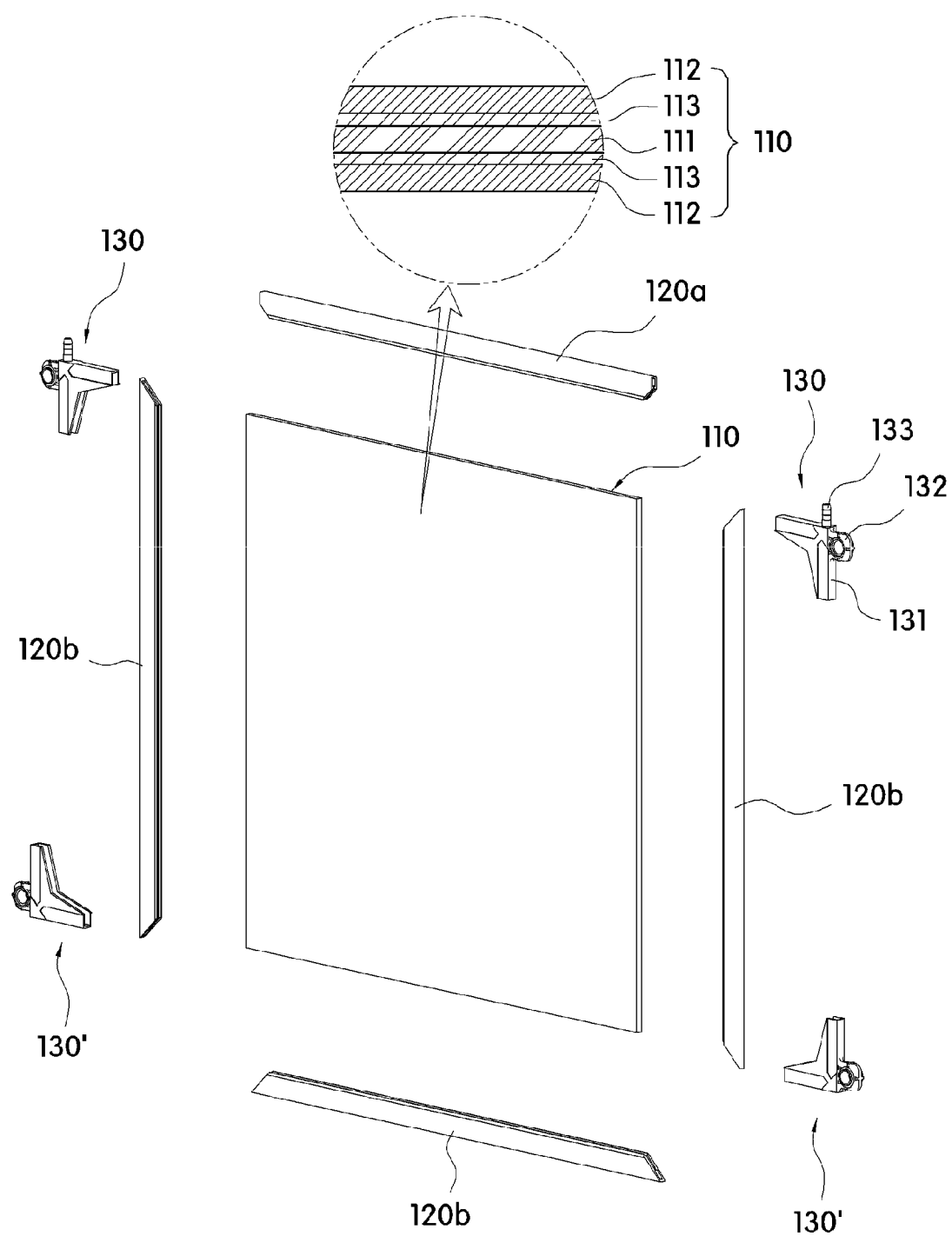
FIG. 2 is an exploded view of FIG. 1.

In this case, the filtration member 110 may have a three-layer structure in which the nanofiber webs 112 are directly attached to both surfaces of the first backing 111, or may have a five-layer structure in which the nanofiber webs 112 are attached to both surfaces of the first backing 111 through second backings 113 as a medium (see FIG. 2).

Here, the second backings 113 may have a thickness smaller than the thickness of the first backing 111 so as to reduce the overall thickness of the filtration member 110 and may be layered on one surface of the first backing 111.

Consequently, the nanofiber webs 112 are attached to the first backing 111 through the second backings 113, instead of being directly provided on the first backing 111, thereby improving adhesion and facilitating attachment.

For example, the nanofiber webs 112 may be attached to the first backing 111 through the second backings 113 by thermal fusion, ultrasonic fusion, high frequency fusion or the like.

Here, the second backings 113 may be partially or completely melted and attached to the first backing 111 in the attachment process.

In this case, the nanofiber webs 112 may have a melting temperature higher than the process temperature of the fusing process so as not to be melted by heat, and the second backings 113 may have a melting temperature lower than the process temperature of the fusion process.

Accordingly, the filtration member 110 may be embodied as a three-layer structure in which the second backings 113 are completely melted, or may be embodied as a five-layer structure in which only portions of the second backings 113 are melted and the other portions of the second backings 113 remain between the nanofiber webs 112 and the first backing 111. However, the structure of the filtration member 110 is not limited thereto. It should be appreciated that one or more back ay be interposed between the two nanofiber webs 112.

In addition, the first backing 111 and the second backings 113 may be porous base materials to serve as paths through which the filtered water produced by the nanofiber webs 112 flows.

For example, the first backing 111 and/or the second backings 113 may be any one of commonly known woven fabric, knitted fabric, and nonwoven fabric, which are used conventionally. Here, the woven fabric means that the fibers included in the fabric are oriented in longitudinal and transverse directions, and the specific structure may be plain weave, twill weave, and the like, and the density of warp and weft yarn is not particularly limited. In addition, the knitted fabric may have a known knit structure, and may be weave knitted fabric light knitted fabric, or the like. However, the knitted fabric is not particularly limited thereto. The nonwoven fabric may be known nonwoven fabric, selected from among dry nonwoven fabric such as chemical bonding nonwoven fabric, thermal bonding nonwoven fabric, airlaid nonwoven fabric; a wet nonwoven fabric; spunlace nonwoven fabric, needle punched nonwoven fabric, or meltblown nonwoven fabric. The pore size, porosity, and basis weight of the nonwoven fabric may vary depending on intended levels of water permeability, filtration efficiency, and mechanical strength.

In other words, the materials of the first backing 111 and/or the second backings 113 are not limited. For example, synthetic fiber selected from the group consisting of polyester, polypropylene, nylon and polyethylene or natural fiber including a cellulose-based material may be used.

However, to prevent separation between the first backing 111 and/or the second backings 113 and the nanofiber webs 112 during the water treatment process by improving the binding force with the nanofiber webs 112 and to prevent problems, such as lowered water permeability due to use of a separate adhesive component, the first backing 111 and the second backings 113 may include a low-melting-point polymer compound, such as low-melting-point polyester or low-melting-point polyethylene capable of thermal fusion, or may be polyester-based low-melting-point conjugated fiber including low-melting-point polyester as a sheath and polyethylene terephthalate as a core and/or polyolefin-based low-melting-point conjugated fiber including low-melting-point polyethylene as a sheath and polypropylene as a core.

Here, the melting point of the low-melting-point polymer compound may be 60 to 180° C., and the thickness of the first backing 111 may be 2 to 200 μm, but the present disclosure is not limited thereto.

Meanwhile, the second backings 113, applied to the present invention, may be made of a material different from that of the first backing 111, but may be made of the same material as the first backing 111 to increase the adhesion with the first backing 111 in the laminating process.

The nanofiber webs 112 are configured to filter impurities contained in liquid to be filtered, and may be made of nanofibers. In this case, the nanofibers may include a fiber forming component, including polyacrylonitrile (PAN) and polyvinylidene fluoride (PVDF), and an emulsifying agent for improving the miscibility of the fiber forming component.

Here, the fiber forming component may include polyacrylonitrile (PAN, hereinafter referred to as PAN) having high hydrophilicity and polyvinylidene fluoride (PVDF, hereinafter referred to as PVDF) having high hydrophobicity.

The PVDF can guarantee the mechanical strength and chemical resistance of the nanofibers due to the nature of the material. Since the PAN is hydrophilic, hydrophobicity of the nanofibers due to the PVDF is prevented and hydrophilicity of the nanofibers is improved, thereby the PAN allows enhanced water permeability to be expressed when the nanofibers are attached to the filtration member.

In addition, the nanofiber webs 112 may include nanofiber webs having a three-dimensional network structure. For example, nanofibers including a fiber-forming component, including polyacrylonitrile (PAN) and polyvinylidene fluoride (PVDF), as well as an emulsifying agent, are laminated perpendicularly to the radiation surface. This can consequently cause fusion at the contacting portions between the laminated nanofibers due to a solvent, which is not volatilized/evaporated in the air during spinning, thereby forming a three-dimensional network structure.

Such the nanofiber webs 112 may be provided as a single layer or may be provided multiple layers.

The support frame 120 may be disposed on the peripheries of the filtration member 110 to support the peripheries of the filtration member 110, such that the filtration member 110 maintains a plate shape.

Although the support frame 120 may be embodied as a single member to totally and partially support the peripheries of the filtration member 110, the support frame 120 may include a plurality of frames 120a and 120b coupled to the peripheries of the filtration member 110.

For example, the plurality of frames 120a and 120b may be disposed on the peripheries of the filtration member 110, respectively, such that one end portion of one frame among the plurality of frames 120a and 120b contacts a corresponding end portion of the other frame of the plurality of frames 120a and 120b. The end portions of two adjacent frames among the plurality of 120a and 120b may be connected to each other through gap adjustment members 130 and 130' disposed on corners of the filtration member 110.

However, the shape of the support frame is not limited thereto. The shape of the support frame may be changed to a variety of shapes, such as a circle, an arc, a polygon, or combinations thereof, according to the shape of the filtration member 110. The support frame may have any shape as long as the support frame covers the entirety of the peripheries of the filtration member.

In this case, the support frame 120 may serve to support the filtration member 110 while serving as a flow path through which the filtered water produced by the filtration member 110 flows to the water-receiving portion 133 due to suction force applied from the outside.

Figure 3:
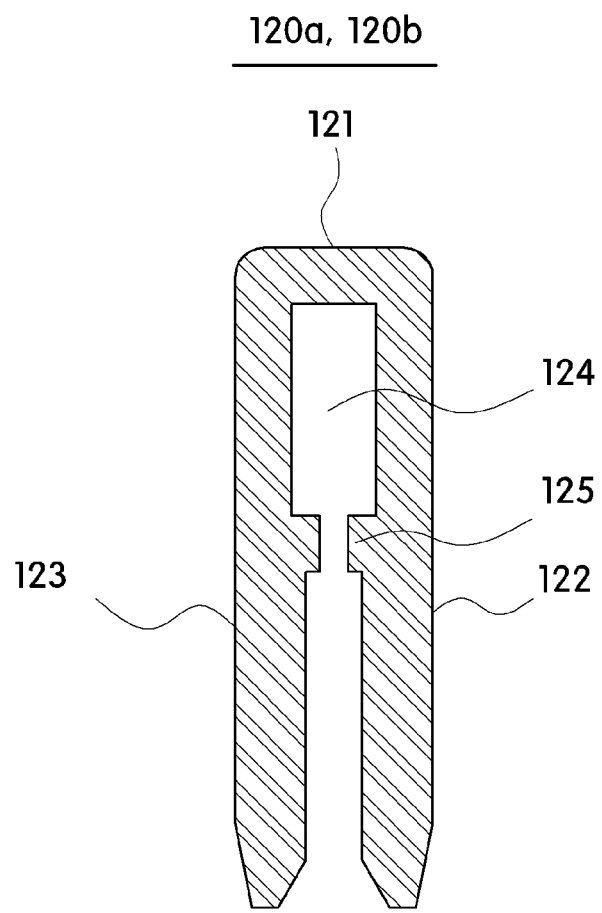
FIG. 3 is a sectional view of a frame applied to FIG. 1.

In this regard, each of the frames 120a and 120b of the support frame 120 may be provided substantially in the shape of a latter 'C' or 'U', with one side thereof being open, and a flow path 125 through which the filtered water introduced from the filtration member 110 flows may be provided in the interior thereof (see FIG. 3).

Specifically, the plurality of frames 120a and 120b may include a first plate 121 having the shape of a plate and a pair of second plates 122 and 123 extending perpendicularly from both end portions of the first plate 121.

Thus, the filtration member 110 may be supported by the pair of second plates 122 and 123 which face each other, with a periphery of the filtration member 110 being inserted into a space defined between the pair of second plates 122 and 123. In this case, the periphery of the filtration member 110 may be inserted into the space, defined between the pair of second plates 122 and 123, to be spaced apart by a predetermined distance from the first plate 121.

That is, a stopper 125 for limiting an insertion depth by which the filtration member 110 is inserted may be provided on the opposite surfaces of the pair of second plates 122 and 123 facing each other (see FIG. 3).

Figure 6:
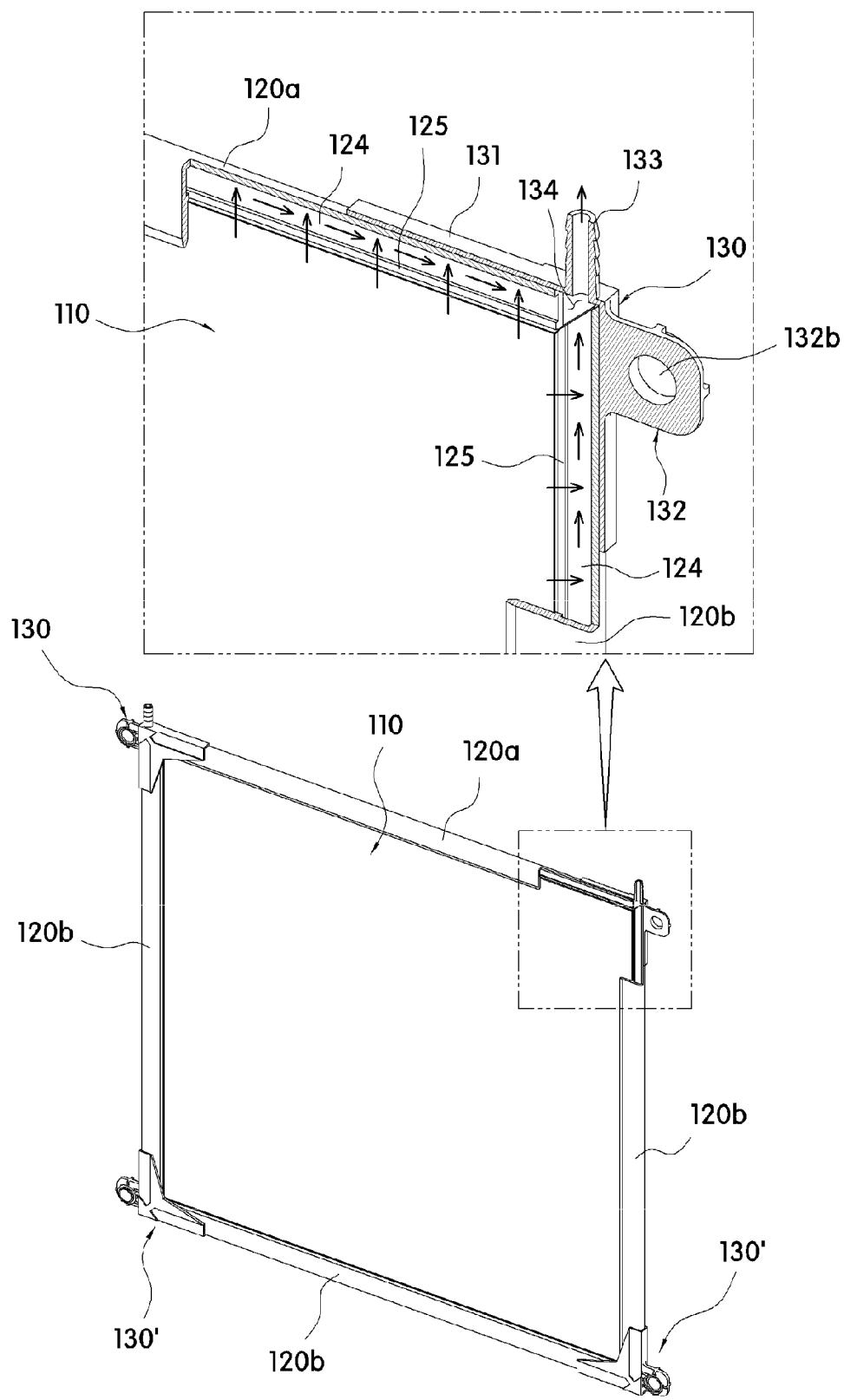
FIG. 6 is a view illustrating a path along which filtered water introduces into the water-receiving portion in the flat filter for water treatment according to the present invention.

Thus, since the insertion depth of the filtration member 110 is limited by the stopper 125 in the process of fastening the periphery of the filtration member 110 to the each of the frames 120a and 120b, a predetermined space may be formed between the periphery of the filtration member 110 and the first plate 121 (see FIG. 6).

Accordingly, when the filtration member 110 and the frames 120a and 120b are coupled, the periphery of the filtration member 110 is always maintained to be spaced apart from the first plate 121, thereby forming a channel 124 along which fluid, such as filtered water or washing water, can flow.

In the present invention, the stopper 125 may be formed on each of opposite surfaces of the pair of second plates 122 and 123 facing each other, but may be formed only on the inner surface of any one of the pair of second plates 122 and 123. In addition, the stopper 125 may be totally or partially provided with respect to the longitudinal direction of each frame. In a case in which the stopper 125 are formed on the opposite surfaces of the pair of second plates 122 and 123 facing each other, the respective stopper 125 are spaced apart from each other at a predetermined gap, thereby filtered water can flow toward the channel 124 through the gap.

The gap adjusting members 130 and 130' are coupled to the corners of the support frame 120 both to fasten the two adjacent frames 120a and 120b and to adjust the gap between the adjacent filtration members 110.

The gap adjustment members 130 and 130' may be provided as a plurality of gap adjustment members. The gap adjustment members 130 and 130' may be coupled to the corners of the support frame 120 and to fix the end portions of two adjacent frames 120a and 120b.

In this regard, the gap adjustment members 130 and 130' may include a body 131 having one open portion, allowing one end portion of an adjacent frame 120a or 120b to be fitted thereinto.

Accordingly, two adjacent frames among the plurality of frames 120a and 120b of the support frame 120 may be fixed by the body 131, with end portions thereof being inserted into the body 131.

Figure 5:
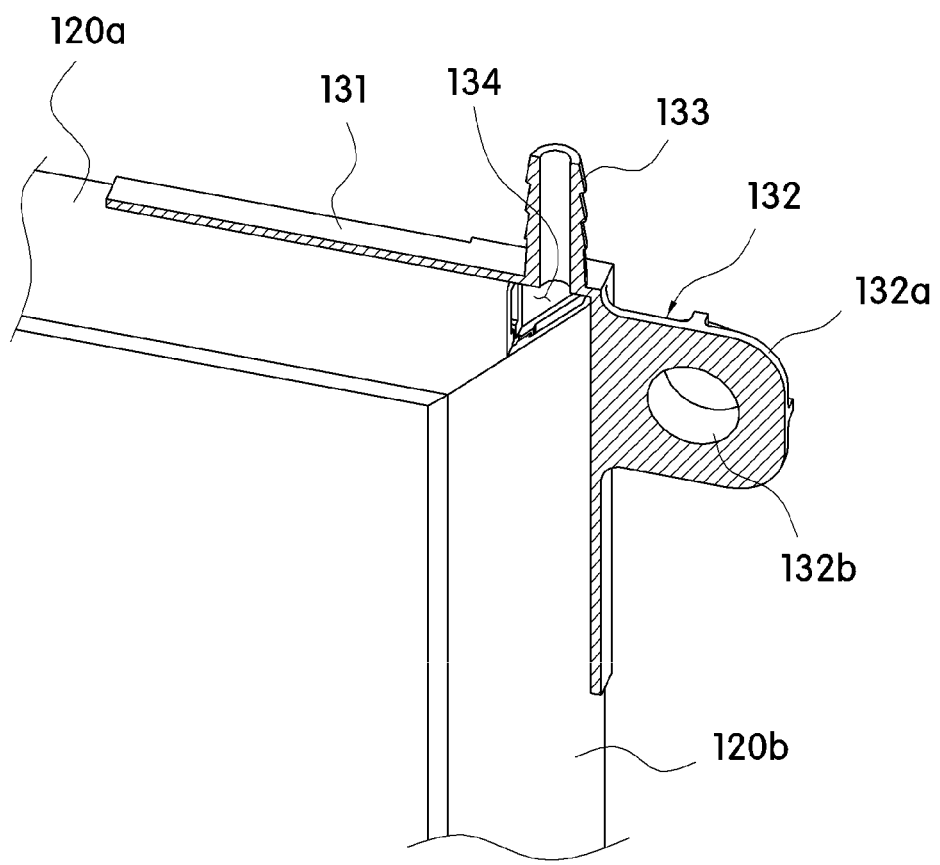
FIG. 5 is a view illustrating a coupling relation between the gap adjustment member and a support frame in FIG. 1.

For example, the end portion of one frame of the two adjacent frames 120a and 120b may be inserted in a first direction of the body 131, while the end portion of the other frame 120b may be inserted in a second direction of the body 131 to be disposed in contact with the end portion of the frame 120a inserted in the first direction (see FIGS. 5 and 6).

In this case, since a channel 124 formed in the frame 120a inserted in the first direction and a channel 124 formed in the frame 120b inserted in the second direction are disposed to communicate with each other, all of the channels formed in the plurality of the frames 120a and 120b may communicate with each other.

Here, the first direction and the second direction may be orthogonal to each other on the same plane or may be inclined to each other to form a predetermined angle with respect to one straight line on the same plane.

Meanwhile, in a case in which a plurality of flat filters 100 for water treatment according to the present invention are arranged in parallel to each other, the flat filter 100 may include a gap adjusting portion 132 so that the respective filtration members 110 may be spaced apart from each other.

The gap adjusting portion 132 may be provided on at least one frame among the plurality of frames 120a and 120b of the support frame 120. Preferably, the gap adjusting portion 132 may be provided on at least one of the gap adjusting members 130 and 130'.

For example, the gap adjusting portion 132 may include an extension plate 132a, having a fastening hole 132b formed therein, and a spacing member 132c. The gap adjusting portion 132 may be provided on one side of the gap adjustment member 130 or 130' (see FIGS. 4 and 5).

Figure 4:
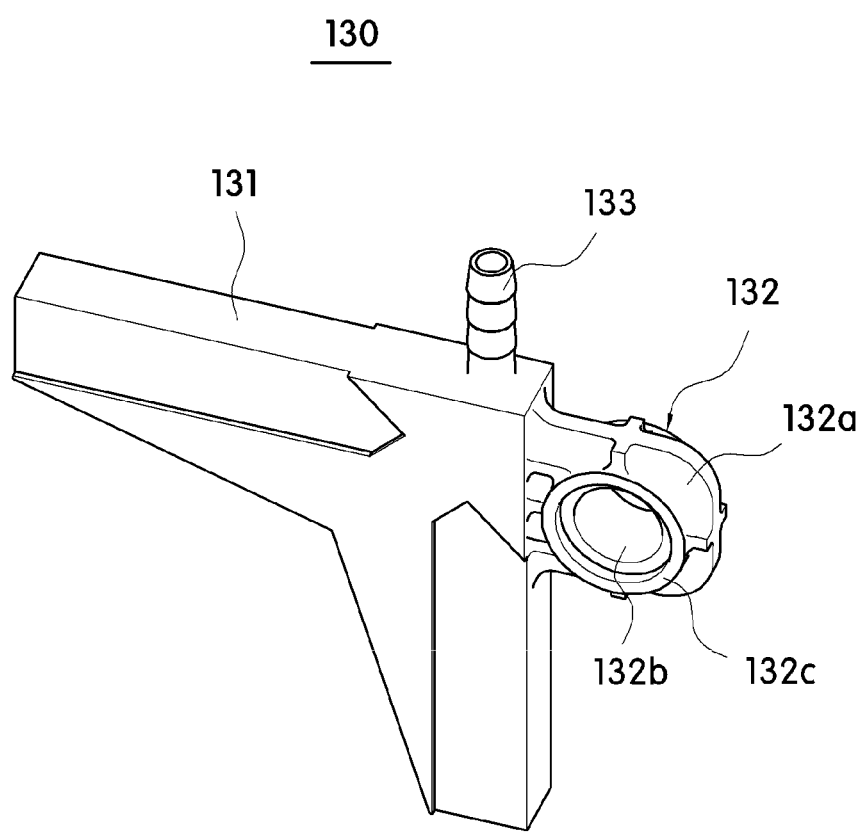
FIG. 4 is a view illustrating a gap adjustment member applied to FIG. 1.

Specifically, the extension plate 132a may extend outward from the body 131 of the gap adjustment member 130 or 130', and may have the fastening hole 132b through which a fastening bar 240 passes (see FIG. 4).

Here, the fastening hole 132b are illustrated as being formed in the extension plate 132a in a circular shape, but the shape of the fastening hole 132b is not limited thereto, and may have a shape corresponding to the cross-sectional shape of the fastening bar 240. For example, the cross-sectional shape of the fastening hole 132b may be one selected from among a circle, an arc, a polygon, and combinations thereof.

In this case, the spacing member 132c may protrude from the one surface of the extension plate 132a to a predetermined height so as to have a predetermined thickness. The spacing member 132c may be provided to surround the entirety or a portion of the periphery of the fastening hole 132b.

Here, the spacing members 132c may be formed on both sides of the extension plate 132a, respectively or may be formed on only one side of the extension plate 132a. In addition, the spacing member 132c may be formed as a multi-step structure including a plurality of stepped portions extending to different heights from one surface of the extension plate 132a.

Here, a plurality of filtration members 110 may be arranged in parallel to each other to have a gap of 3 mm or more, but are not limited thereto. In addition, the plurality of filtration members 110 may be disposed to have various gaps by suitably changing the height or thickness of the spacing members 132c.

Figure 9:
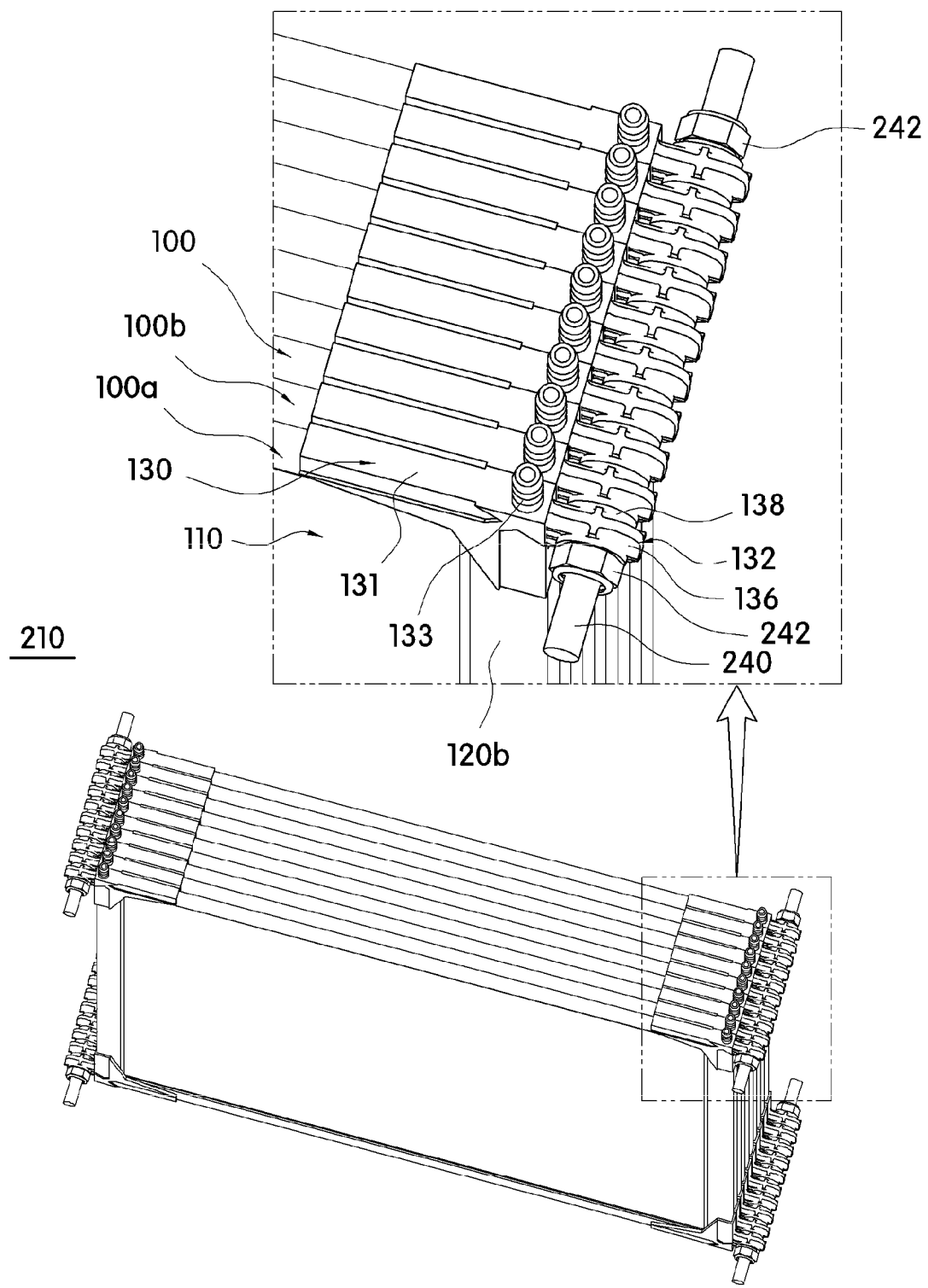
FIG. 9 is an enlarged view illustrating a coupling relation between the gap adjustment member and the fastening bar in FIG. 8.

Thus, in a case in which the plurality of the flat filter 100 for water treatment according to the invention are connected to each other through the fastening bars 240, the plurality of filtration members 110 disposed parallel to each other may be spaced apart from each other through the spacing members 132c even if the respective flat filters 100 are completely in contact with each other (see FIG. 9).

Accordingly, when the plurality of the flat filters 100 for water treatment are disposed in parallel, the fastening bars 240 are fastened to pass through the fastening holes 132b, respectively, and then the flat filters 100 are brought into close contact with each other, the adjacent filtration members 110 may be spaced apart from each other at predetermined gaps through the spacing members 132c.

That is, in a case in which a flat filter module 200 is configured using a plurality of flat filters 100 for water treatment, when the flat filters 100 connected to the fastening bar 240 are brought into close contact with each other, uniform gaps may be formed between the adjacent filtration members 110 by the spacing members 132c, even if an operator does not adjust the gaps between the flat filters, respectively. In addition, when fixing members, such as nuts, are fastened to both ends of the fastening bar 240, the gaps between the filtration members 110 may be maintained.

Accordingly, since liquid to be filtered may be present on both sides of each of the filtration members 110, liquid to be filtered can flow from both sides of the filtration member 110 to the inside of the filtration member 110 due to suction force provided from the outside, thereby producing filtered water.

In addition, in a case in which a back-washing operation is performed to remove impurities adhered to the filtration member 110 after the repetitive production operations of the filtered water have been performed, the impurities adhered to the filtration member 110 may be separated by the pressure of fluid, such as washing water, supplied from the outside, thereby falling into a space between the adjacent filtration members 110.

Meanwhile, at least one of the gap adjustment members 130 may include an water-receiving portion 133 to discharged the filtered water flowing along the channel 124 formed in each of the frames 120a and 120b to the outside (see FIG. 4).

That is, in the plurality of gap adjustment members 130 and 130' coupled to the corners of the supporting frame 120, each gap adjustment member 130' without the water-receiving portion 133 may only serve to connect a pair of adjacent frames, while each gap adjustment member 130 including the water-receiving portion 133 may serve to connect a pair of adjacent frames and also serve as an outlet for discharging filtered water to the outside through the water-receiving portion 133.

The water-receiving portions 133 may be connected to a collecting member 230, which will be described later.

Here, although the water-receiving portion 133 may be provided only in one gap adjustment member among the plurality of gap adjustment members, it is preferable that the water-receiving portion 133 be provided on each of the two gap adjustment members 130 to provide uniform suction pressure toward the filtration member 110.

Figure 7:
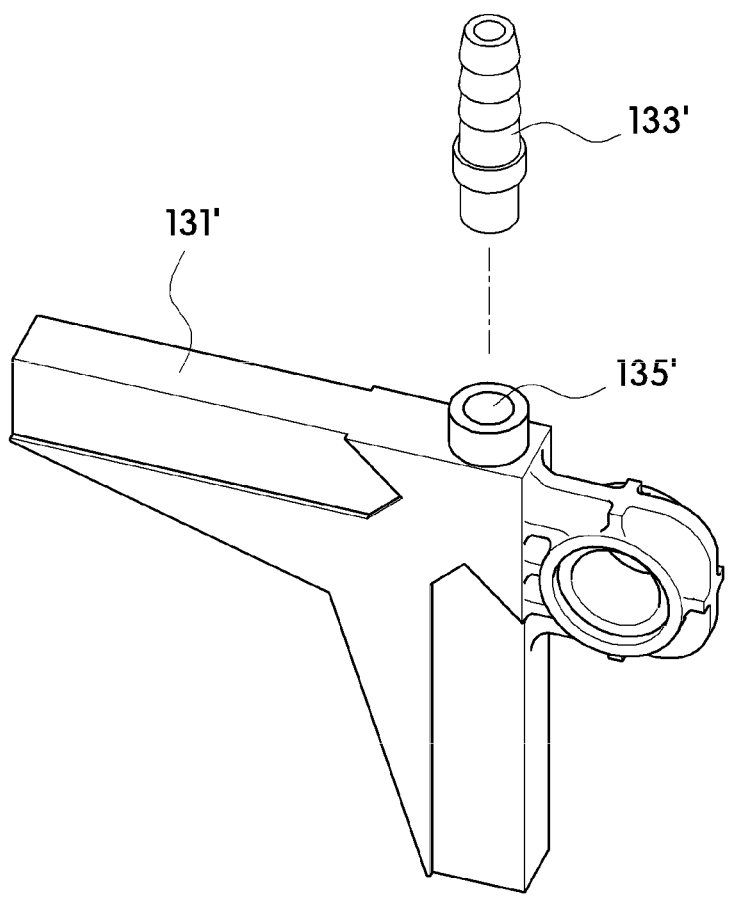
FIG. 7 is a view illustrating another configuration of the water-receiving portion in a flat filter for water treatment according to the present invention.

In addition, although the water-receiving portion 133 may be formed integrally with the body 131 of the gap adjustment member 130 (see FIG. 4), a coupling hole 135' may be formed in the body 131' and an water-receiving portion 133' having a predetermined length may be detachably coupled to the coupling hole 135'. That is, as illustrated in FIG. 7, the water-receiving portion 133' may be provided as a hollow member having a predetermined length and may be screwed or fitted into a coupling hole 135' formed in the body 131'. Accordingly, when the water-receiving portion 133' is required to be changed or replaced during use, only the water-receiving portion 133' may be easily removed to be replaced or changed by a new one.

In this case, when the gap adjustment member 130 including the water-receiving portion 133 is coupled to two adjacent frames 120a and 120b, the gap adjustment member 130 may be provided with a collection space 134 communicating with the channels 124 formed in the two frames 120a and 120b, the collection space 134 may be provided in a position communicating with the water-receiving portion 133.

For example, the collection space 134 may be formed in the end portions of the two frames 120a and 120b, which are inserted into the gap adjustment member 130 when the gap adjustment member 130 having the water-receiving portion 133 is coupled to the two frames 120a and 120b. The collection space 134 may also be formed by cutting the end portion of one of the two frames 120a and 120b inserted into the gap adjustment member 130 (see FIG. 5) so that the shapes of the end portions of the frames 120a and 120b do not conform to each other.

Accordingly, filtered water flowing along the channel 124 formed in one frame 120a of the frames 120a and 120b and filtered water flowing along the channel 124 formed in another frame 120b thereof may join each other in the collection space 134, and may be discharged to the outside through the water-receiving portion 133 communicating with the collection space 134 (see FIG. 6).

As a result, the filtered water produced in a process of flowing from the outside to the inside of the filtration member 110 by suction force provided from a pump 320 may flow into the channels 124 of the plurality of frames 120a and 120b, and may be discharged to the outside through the water-receiving portion 133 after the filtered water flows toward the collection space 134 along the channels 124.

In contrast, in the back-washing operation, a fluid, such as washing water, supplied from the outside may pass through the collection space 134 after the fluid is introduced inside through the water-receiving portion 133, and then may flow into the channels 124 formed in the plurality of frames 120a and 120b.

Meanwhile, a plurality of flat filters 100 for water treatment, as described above, may be arranged in parallel to each other and be fixed to each other through the fastening bars 240, thereby modularizing into a single filter module 200 for water treatment.

Figure 8:
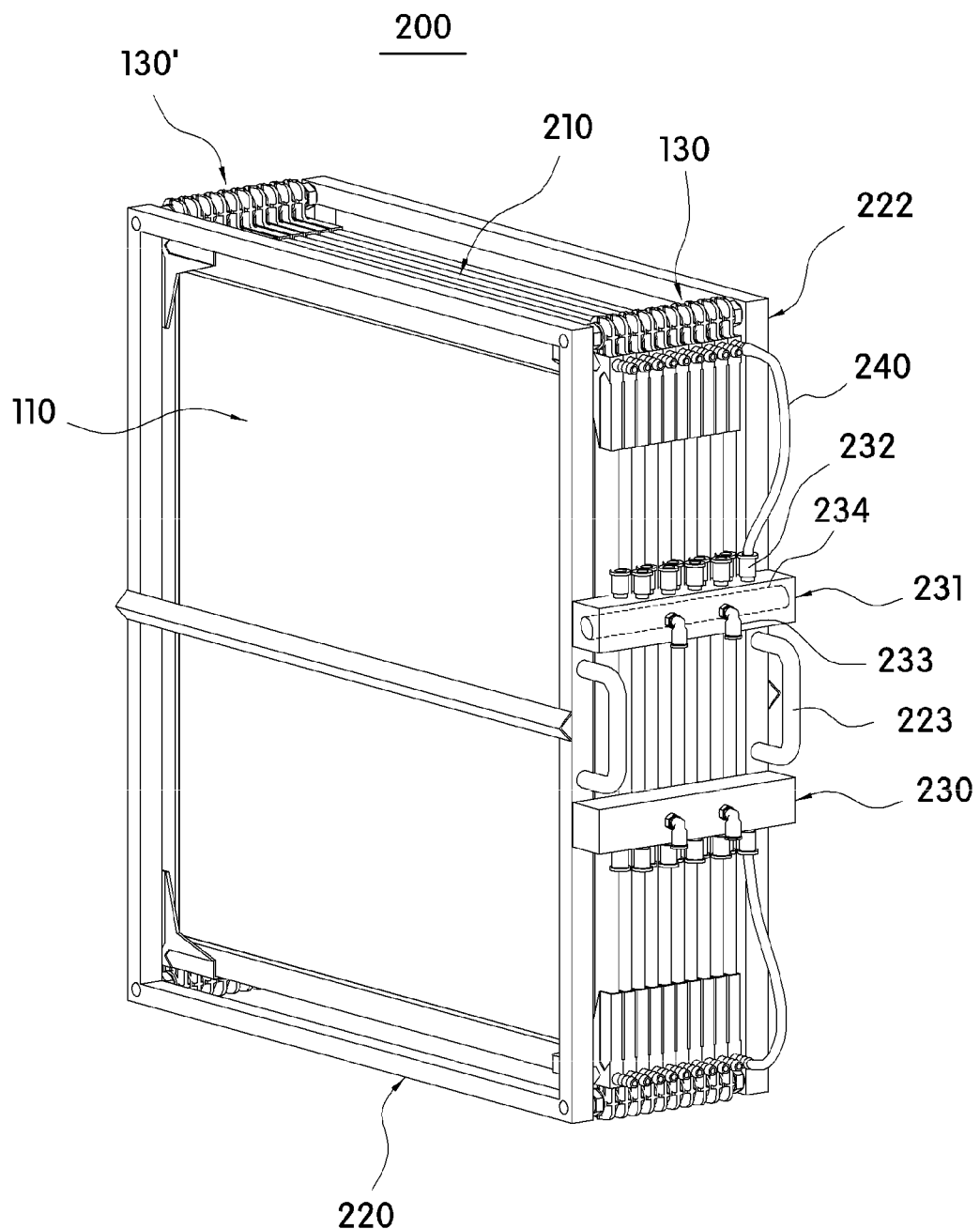
FIG. 8 is a view illustrating a filter module for water treatment according to an embodiment of the present invention.

For example, as illustrated in FIG. 8, the filter module 200 for water treatment may include a filter assembly 210, a fixing frame 220, and a collecting member 230.

The filter assembly 210 may include a plurality of flat filters 100 for water treatment as described above. In addition, the filter assembly 210 may be a form integrated through the fastening bar 240 having a predetermined length in state in which the plurality of flat filters 100 are arranged in parallel to each other.

Here, the plurality of flat filters 100 may for water treatment may include a filtration member 110, a support frame 120, and gap adjustment members 130 and 130'. In this embodiment, since the filtration member 110, the support frame 120, and the gap adjustment members 130 and 130' are the same as those described above, detailed descriptions thereof will be omitted.

In this case, in the filter assembly 210, the adjacent filtration members 110 may be spaced apart from each other through the spacing members 132c thereof such that a predetermined space is formed between the filtration members 110 facing each other.

Specifically, as illustrated in FIG. 9, when one filter 100b (hereinafter referred to as a "second filter") of the plurality of filters arranged in parallel is brought into close contact with the rear surface of another filter 100a (hereinafter referred to as a "first filter"), the spacing members 132c of the gap adjustment members 130 and 130' provided in the first filter 100a and the spacing members 132c of gap adjustment members 130 and 130' provided in the second filter 100b are in contact with each other.

Accordingly, a predetermined space may be formed between the filtration member 110 of the first filter 100a and the filtration member 110 of the second filter 100b by pairs of spacing members 132c, which are in contact with each other. That is, when the plurality of filters 100 are fastened to the fastening bars 240 such that the filters 100 are in close contact with each other, predetermined gaps may be formed between the filters 100 arranged adjacent to each other by the spacing members 132c in the process in which the filters 100 are fit together through the fastening bars 240.

This can consequently eliminate the inconvenience that the operator has to adjust the gaps between the filters 100 one by one. In addition, in a case in that the plurality of filters are brought into close contact with each other, the gaps between the filters may be formed to be uniform since the gaps between the filters are formed by the spacing members 132c.

In addition, when the fixing members 242 such as a nut are fastened to both sides of the fastening bars 240, the gaps formed between the respective filters may be maintained to be uniform.

The fixing frame 220 may be coupled to both end portions of the fastening bars 240 such that it is integrated with the filter assembly 210.

The fixing frame 220 may be embodied as a plate-shaped member, but may be provided as a frame structure allowing liquid to be filtered to flow into the filter assembly 210.

For example, the fixing frame 220 may include a front frame 221 and a rear frame 222 disposed on the front and rear surfaces of the filter assembly 210, respectively. In addition, both end portions of the fastening bars 240 may be coupled to the front frame 221 and the rear frame 222, respectively. Accordingly, the filter assembly 210 and the fixing frame 220 may be integrated through the fastening bars 240.

Here, the front frame 221 and the rear frame 221 may include fastening holes (not shown), into which the end portions of the fastening bars 240 are inserted in the fitting manner, or may include through-holes (not shown), through which the fastening bars 240 passes, with both end portions thereof being fixed using separate fixing members.

In this case, a handle 223 may be provided on a portion of the fixing frame 220 such that the user or operator may easily hold the modularized flat filter module 200.

Further, each of the members constituting the front frame 221 and the rear frame 221 may be a plate-shaped bar having a predetermined width and length, may be an I-beam or an L-beam, or may be provided as a pipe having a polygonal cross-section.

As described above, the filter module 200 for water treatment according to the present invention, the plurality of flat filters 100 may be arranged in parallel to each other, and the filtration members 110 of the respective flat filters 100 may be arranged in a state in which the filtration members 110 are spaced apart from each other at predetermined gaps through the spacing members 134*c*.

Accordingly, suction force provided from the outside, for example, suction force provided from one pump 320 may be transmitted to a plurality of flat filters 100 through the respective water-receiving portions 133 such that each of the plurality of flat filters 100 may produce filtered water in a single process.

Consequently, it is possible to simultaneously produce a large amount of filtered water using the plurality of flat filters 100, thereby improving the production efficiency of the filtered water.

The collecting member 230 serves to transmit suction force to each of the filters so that filtered water can be simultaneously produced by the filters in a single suction process and also serves to collect filtered water produced by the filters.

That is, since the collecting member 230 is connected to the water-receiving portion 133 of each of the filters 100, suction force provided from the outside may be simultaneously transmitted to the respective filters, and filtered water may be separately produced by the filters 100 using the suction force transmitted thereto. Then, filtered water produced by the filters 100 may be introduced into the collecting member 230 via the collection space 134 and the water-receiving portion 133 by suction force, thereby being integrated.

In addition, the collecting member 230 may distribute high-pressure fluid, such as washing water or high-pressure air supplied from the outside to the respective filters 100 during the back-washing process.

The collecting member 230 may be provided as a single member. Alternatively, in a case in which each of the filters includes a plurality of water-receiving portions 133, the collecting member 230 may be provided in an appropriate number corresponding to the number of the water-receiving portions 133 and may be connected in one-to-one relationship to each of the water-receiving portions 133.

For example, as illustrated in FIG. 8, when two water-receiving portions 133 are provided on the upper portion and the lower portion of each of the filters 100, two collecting member 230 may also be provided. In addition, one of the two collecting members 230 may be connected to the water-receiving portion 133 located on the upper portion and the other collecting member 230 may be connected to the water-receiving portion 133 located on the lower portion.

The collecting member 230 may include a main body 231 having a storage space 234 in which filtered water introduced from the water-receiving portions 133 is temporarily collected, inlets 232 for introducing the filtered water discharged from the water-receiving portion 133 into the storage space 234 and outlets 233 for discharging filtered water introduced from the storage space 234 to the outside (for example, a filtered water storage tank 350) or providing suction force supplied from the outside to the water-receiving portion 133.

Here, in a back-washing process for removing impurities adhered to the filtration member 110, the inlets 232 may serve as outlets for supplying high-pressure fluid to the filter 100, and the outlets 233 may serve as inlets for introducing the high-pressure fluid supplied from the outside into the collecting member 230.

In this case, a plurality of inlets 232 may be provided to be connected to the water-receiving portions 133 of the filters 100, respectively. In addition, the inlets 232 and the receiving port 133 may be connected to each other in one-to-one relationship.

Figure 10:
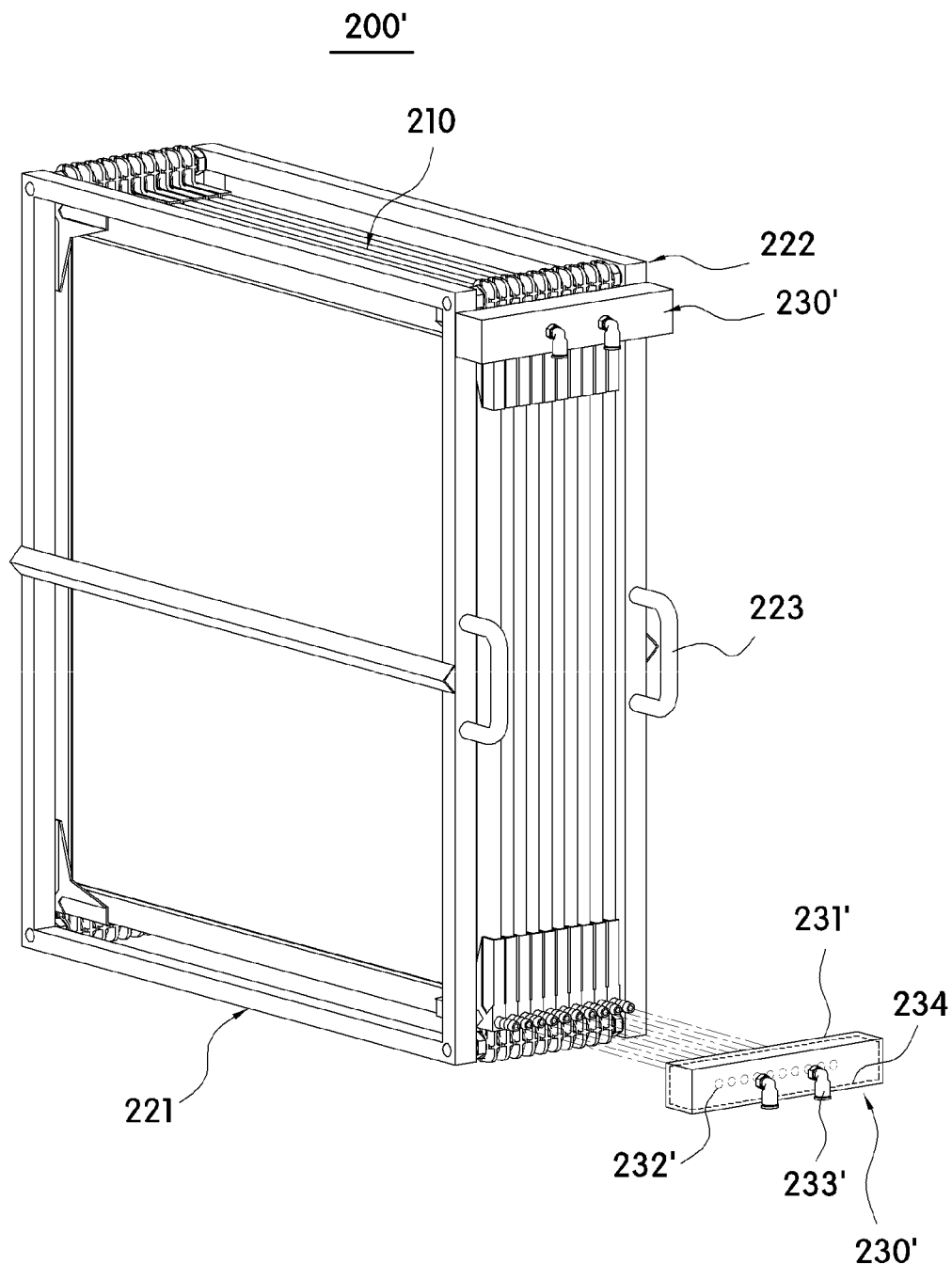
FIG. 10 is a view illustrating a filter module for water treatment according to another embodiment of the present invention.

For example, as illustrated in FIG. 8, the plurality of inlets 232 may be connected in one-to-one relationship to the water-receiving portions 133 through tubes 240. As illustrated in FIG. 10, the water-receiving portions 133 may be directly connected to the inlets 232' of the collecting member 230'.

Here, in a case in which the water-receiving portions 133 are directly connected to the inlets 232' of the collecting member 230, the inlets 232' may be formed into holes on a surface of the main body 231' having a storage space 234 in which filtered water introduced from the water-receiving portions 133 is temporarily collected, such that water-receiving portions 133 protruding by a predetermined length are directly inserted into the inlets 232'. In this case, a sealing member (not shown) may be provided on contact surfaces of the inlets 232' and the water-receiving portions 133 to prevent filtered water from leaking.

Meanwhile, in a case in which the inlets 232 and the water-receiving portions 133 are connected through the tubes 240, the collecting member 230 may be disposed at a middle portion of the fixing frame 220 so as to be spaced apart from the water-receiving portions 133 to a predetermined distance.

This is because, if the gap between the water-receiving portions 133 and the inlets 232 is too narrow, the tube 240 may be bent during a connection process, thereby preventing filtered water from smoothly flowing.

Like this, in the filter module 200 for water treatment according to the present invention, since the collecting member 230 is connected to the water-receiving portions 133 of the filters 100, filtered water may be produced simultaneously by the filters in a single suction process, and a back-washing process for removing impurities adhered to the filtration members 110 may also be performed simultaneously. In addition, since the plurality of filters 100 spaced apart from each other at appropriate gaps through the gap adjustment members 130 and 130' are integrated as a single module, the filter module 200 may be easily installed and may be easily replaced as a module, thereby advantageously facilitating maintenance.

Figure 11:
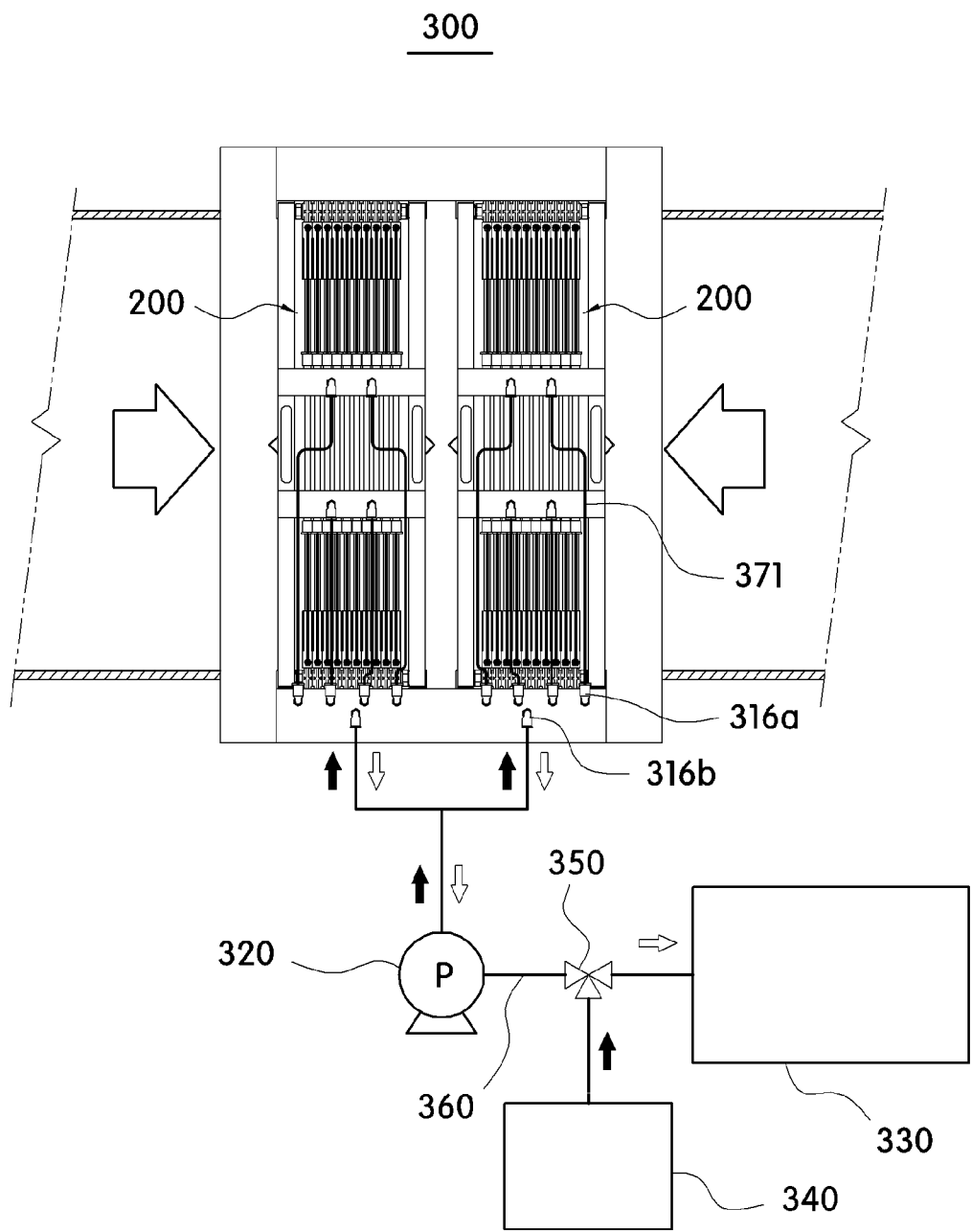
FIG. 11 is a schematic view illustrating a wastewater treatment system to which a filter module for water treatment according to the present invention is applied.
Figure 12:
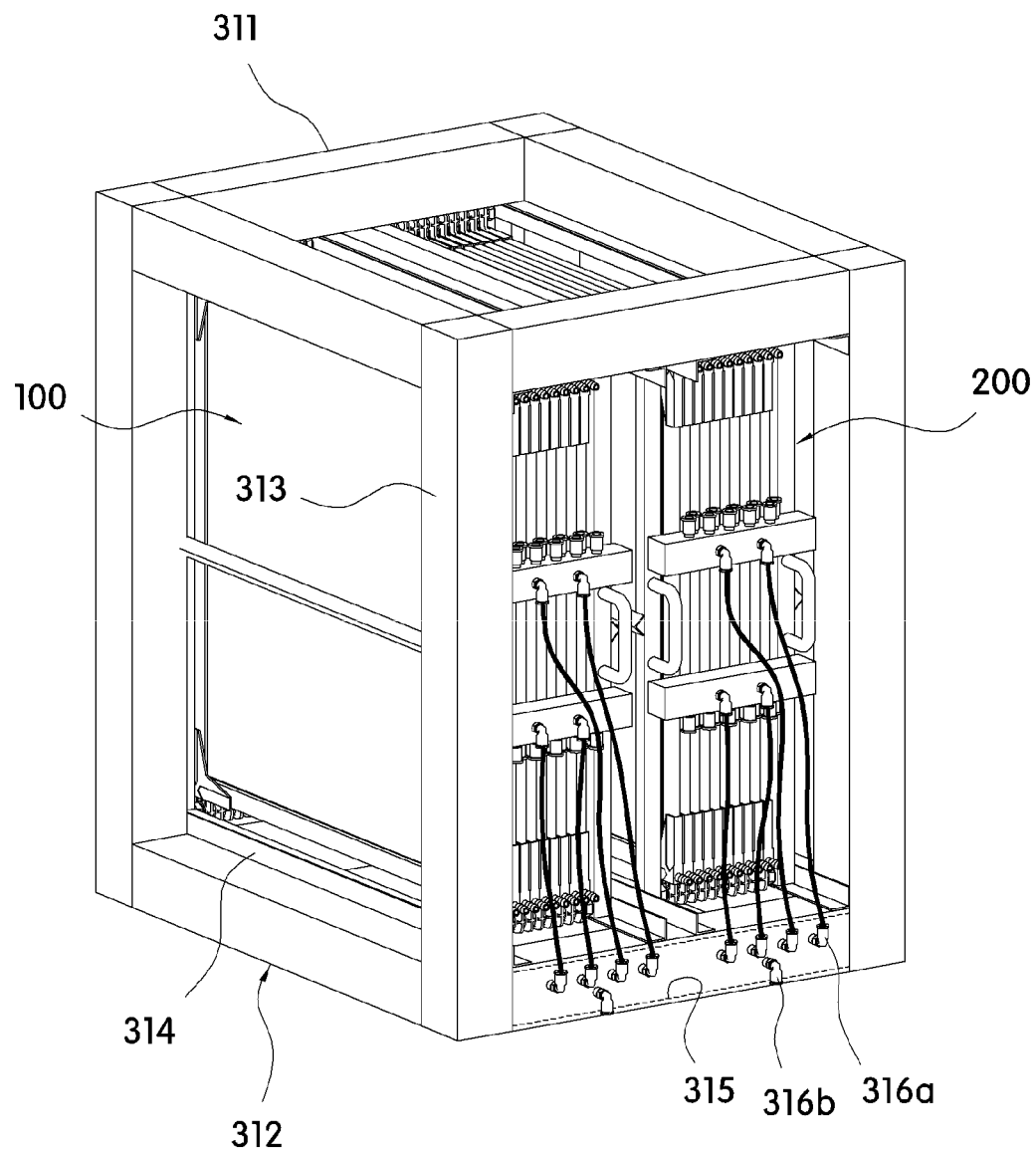
FIG. 12 is a view illustrating a position in which the filter module for water treatment and a main frame applied to FIG. 11 are combined.

The above-described filter module 200 for water treatment may be applied to a wastewater treatment system 300. For example, as illustrated in FIG. 11, the wastewater treatment system 300 may include at least one filter module 200, a main frame, and a pump 320.

The filter module 200 is intended to produce filtered water by filters 100 using suction force provided by the pump 320. The filter module 200 may include a filter assembly 210 that a plurality of filters 100 are coupled to each other through fastening bars 240, a fixing frame 220, and a collecting member 230.

The filter module 200 may be provided as a single module, but may be provided in a plurality of filter modules. In addition, the plurality of filter modules may be supported by the main frame.

Here, the filter assembly 210, the fixing frame 220, and the collecting member 230, which are components of the filter module 200, are the same as those described above, and detailed descriptions thereof will be omitted.

The main frame is intended to support the filter module 200, and may be embodied as a hollow frame structure having a main channel therein.

The main frame may include an upper main frame 311 disposed above the filter module 200 and a lower main frame 311 disposed below the filter module 200 to firmly support the filter module 200, in which the upper main frame 311 and the lower main frame 312 may be connected to each other through a plurality of support bars.

Thus, the main frame may form a space for accommodating at least one filter module 200 therein.

Figure 13:
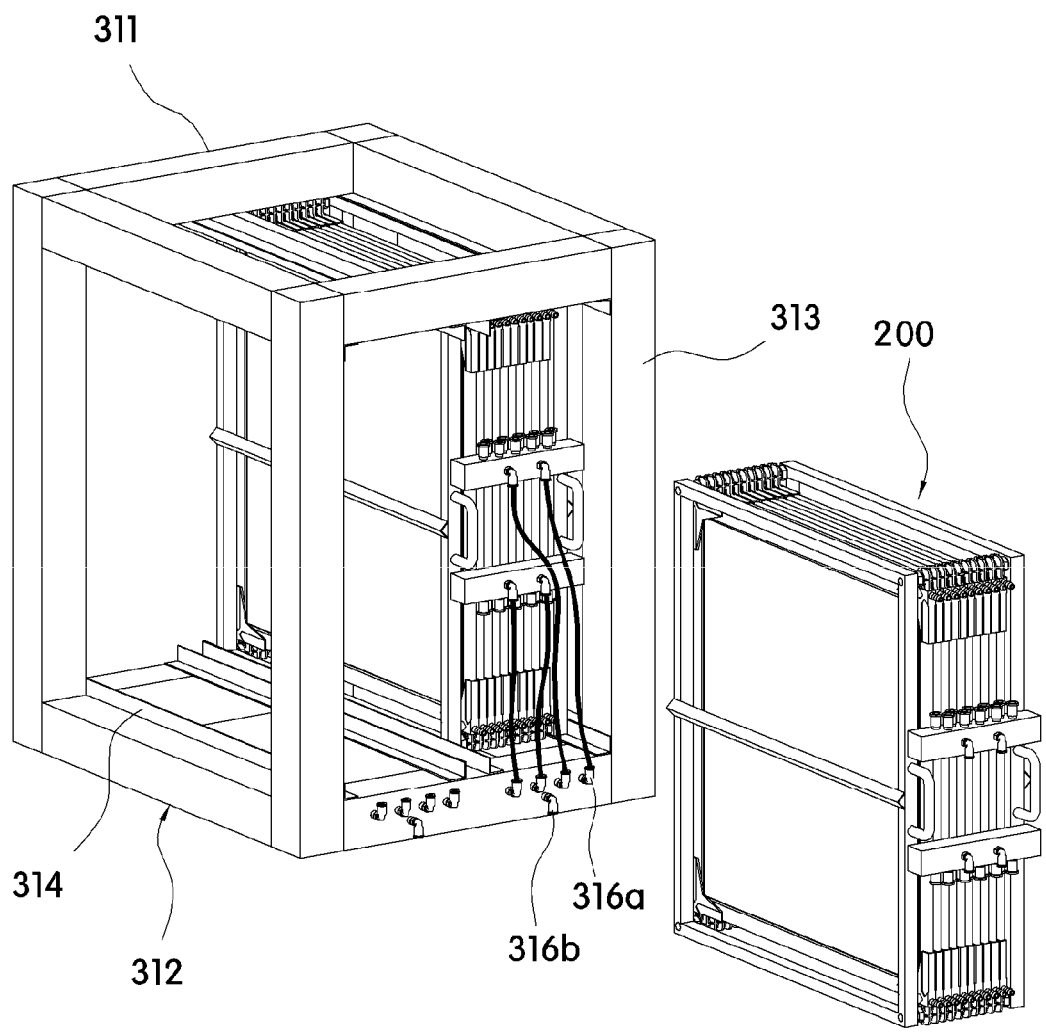
FIG. 13 is a view illustrating a position in which one filter module among a plurality of filter modules for water treatment in FIG. 11 are separated from the main frame.

In this case, at least one of the upper main frame 311 and the lower main frame 312 may be provided with guide rails 314 guiding sliding movements of the filter module 200 by supporting the edges of the filter module 200 during insertion of the filter module 200 (see FIG. 13).

For example, each of the guide rails 314 may be provided as substantially L-shaped angle bars and may be disposed in the same direction as the direction in which the filter module 200 is inserted. Accordingly, when the filter module 200 is inserted, the filter module 200 may be smoothly slid, since the edges thereof are supported.

Preferably, the guide rails 314 may be provided on both the upper main frame 311 and the lower main frame 312 to simultaneously support the upper edges and the lower edges of the filter module 200.

Meanwhile, at least one of the upper main frame 311 and the lower main frame 312 may include a main channel 315 formed therein to collect filtered water introduced from the filter modules 200.

For example, the main channel 315 may be formed in any one of a plurality of members of the lower main frame 312. In addition, the lower main frame 312 may be provided with a plurality of fittings 316a and 316b communicating with the main channel 315.

Here, the plurality of fittings 316a and 316b serve as inlets and outlets for the inflow or outflow of filtered water, some fittings 316a among the plurality of fittings 316a and 316b may be connected to the outlets 233 of the collecting member 230 through connection pipes 371. In this case, the connection pipes 371 may be implemented as rigid tubular members or may be implemented as known pipes made of a flexible rubber material.

In addition, the remaining fittings 316b among the plurality of fittings 316a and 316b may be connected to a filtered water storage tank 330, allowing filtered water, produced by the filters using suction force provided by the pump 320, to flow into the filtered water storage tank 330.

Here, when a single filter module 200 is provided, the main frame 310 may be omitted. In this case, the outlets 233 of the collecting member 230 may be directly connected to the filtered water storage tank 350.

The pump 320 is connected to at least one of the fittings 316b among the fittings 316a and 316b of the main frame 310 and may provide suction force to produce filtered water by the filters 100 provided in the filter modules 200.

That is, suction force provided by the pump 320 may be transmitted to the filtration member 110 through the main channel 215, the collecting member 230, the water-receiving portions 133, and then the channels 124 formed in the plurality of frames 120a and 120b of the support frame. Accordingly, liquid to be filtered, such as sewage or wastewater, existing around the filters 100 may flow toward the filtration members 110 by suction force, thereby being filtered through the nanofiber webs 112. And then, filtered water flown to the first backing layers 111 through the nanofiber webs 112, may be introduced into the channels 124 of the support frame by suction force and, may flow toward the collection spaces 134. Thereafter, filtered water may flow to collecting member 230 through the water-receiving portions 133 and may be collected. After collected in the collecting member 230, filtered water may flow along the main channel 315 of the main frame to be stored in the filtered water storage tank 330.

Accordingly, the wastewater treatment system 300 according to the present invention may produce a large amount of filtered water because a plurality of filters can be operated simultaneously by suction force provided by the pump 320.

Meanwhile, in the case in which contaminants are adhered to the surfaces of the filtration members 110, more specifically, the surfaces of the nanofiber webs 112 due to repetitive filtration operations, the wastewater treatment system 300 may supply fluid, such as washing water or air, to the respective filters 100 using the pump 320 to remove, the contaminants from the surfaces of the nanofiber webs 112. As a result, the contaminants adhered to the surface of the filtration member 110 may be desorbed by the supply pressure of fluid.

For example, at least some the fittings 316b among the plurality of fittings 316a and 316b may be connected to a washing water storage tank 340 in which washing water is stored. Here, the fittings 316b connected to the washing water storage tank 340 may be fittings 316b connected to the filtered water storage tank 330, and a channel control valve 350 may be provided on the connection pipe 360, thereby controlling the connection pipe 360 to be selectively connected to or disconnected from the filtered water storage tank 330 and the washing water storage tank 340.

Accordingly, when the filtration member 110 needs to be cleaned, washing water stored in the washing water storage tank 340, may be supplied to the respective filters 100 by the pump 320. As a result, contaminants adhered on the filtration member 110 may be removed by the pressure of the washing water.

Specifically, washing water, stored in the washing water storage tank 340, may be supplied to the respective filters 100 by the pump 320 at a predetermined pressure. In this case, two water-receiving portions 133 may be provided on each of the filters 100, such that washing water may be uniformly and totally introduced into the filtration members 110 by flowing in both directions along the channels 125 formed in the support frame 120. Accordingly, washing water, supplied to the channel sides of the support frame through the water-receiving portion 133, may flow to the filtering member 110 and may desorb the contaminants remaining on the surface of the filtering member 110 by supply the pressure thereof, thereby removing the contaminants from the surfaces of the filtration members 110. Here, the contaminants desorbed from the filtration member 110 may fall through the spaces formed between the filters by the spacing members 132c.

Figure 14:
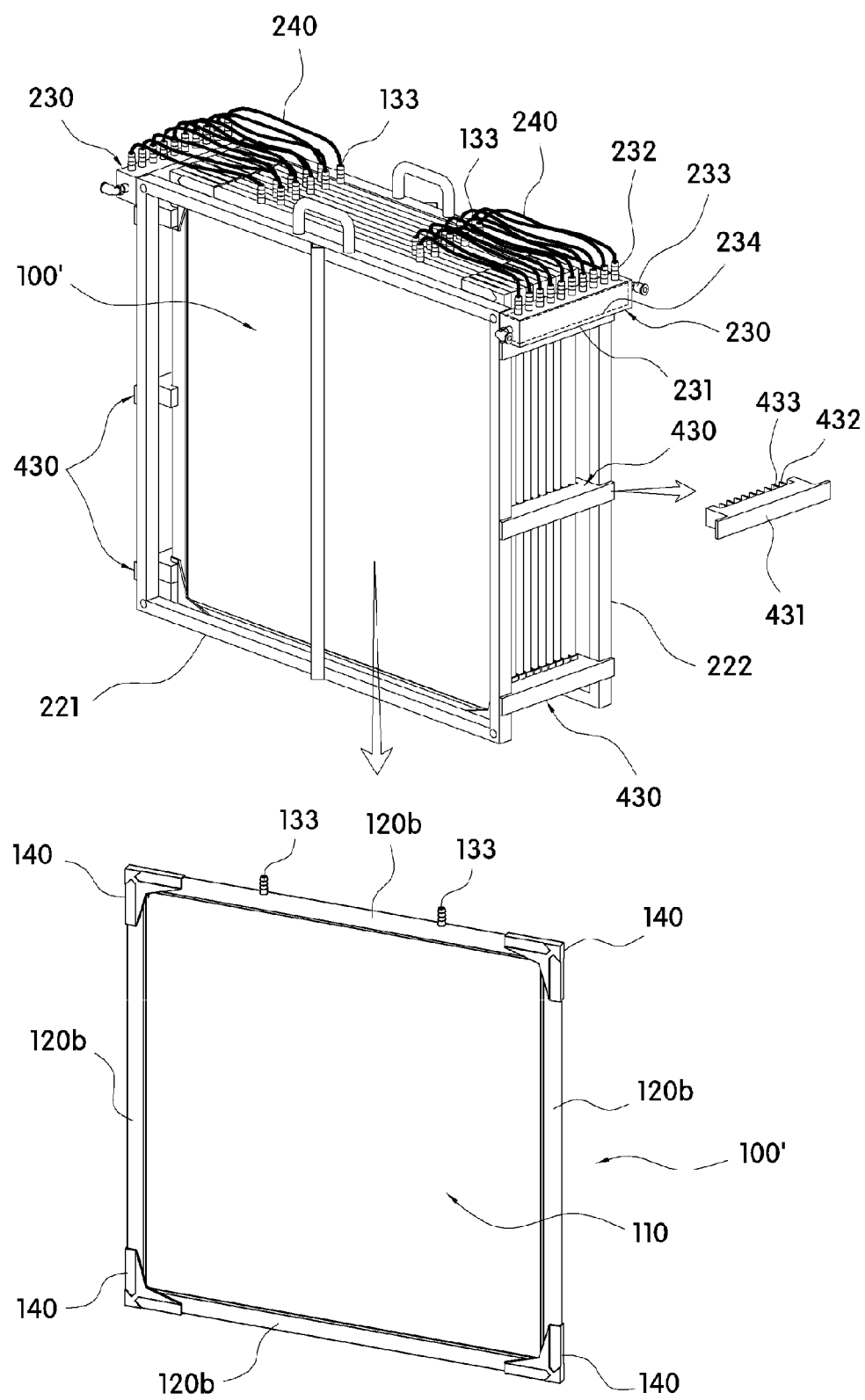
FIG. 14 is a view illustrating a filter module according to another embodiment of the present invention.

Meanwhile, a filter module 400 for water treatment according to another embodiment of the present invention is illustrated in FIG. 14. That is, the filter module 400 for water treatment may include fitting members 430 as a means for adjusting gaps between adjacent filters among a plurality of filters 100'.

That is, the filter module 400 for water treatment may include a plurality of flat filters 210' for water treatment, a fixing frame, a collecting member 230, and the fitting members 440.

In the present embodiment, each of the plurality of filters 100' may include a support frame including the above-described filtration member 110 and a plurality of frames 120b, and may be configured to connect adjacent end portions of the frames 120b using separate connection members 140. In addition, the fitting member 430 may substitute for the function of the gap adjusting portion (132 in FIG. 1) for adjusting the gaps between the adjacent filters 100.

In addition, the filter 100' may include the same components as those of the filter 100 illustrated in FIG. 1, except for the gap adjusting portion 132. Although the water-receiving portion 133 formed in each of the filters may be provided in the connection member 140, the water-receiving portion 133 may be provided in the middle of the length of the frame 120b of the support frame so as to communicate with the channel 124 formed in the frame.

In this case, the connection members 140 coupled to the corners of the support frame merely serve to connect the end portions of the adjacent frames 120b to each other. The remaining components are the same, and detailed descriptions thereof will be omitted.

For example, the filter module 400 for water treatment according to the present embodiment may be configured such that the water-receiving portions 133 are provided in middle portions of the length of each of the frames 120b of the support frames, the filters 100' are spaced apart from each other at predetermined gaps through the fitting member 430, and the water-receiving portions 133 of the filters 100' are connected in one-to-one relationship to the inlets 232 of the collecting member 230 through the tubes 240.

Here, the collecting member 230 may include a main body 231 having a storage space 234 in which filtered water introduced from the water-receiving portions 133 is temporarily stored, inlets 232 for introducing filtered water discharged from the water-receiving portions 133 into the storage space 234, outlets 233 for discharging filtered water from the storage space 234 to the outside (for example, the filtered water storage tank 350) or providing suction force supplied from the outside to the water-receiving portions 133. Since details of the collecting member 230 are the same as those described above, detailed descriptions thereof will be omitted.

The fitting members 430 are intended to adjust the gap between the plurality of filters.

Each of the fitting members 430 may include a connection bar 431 and a plurality of support pieces 432. In this case, both end portions of the connection bar 431 may be in contact with the pair of frames 221 and 222 of the fixing frame. In addition, the plurality of support pieces 432 may be disposed on one surface of the connection bar 431 in the longitudinal direction to be spaced apart from each other at predetermined gaps, and may protrude from the connection bar 431 in the same direction to each other. Accordingly, fitting recesses 433 may be formed between adjacent support pieces 432, such that the filters 100' may be inserted into the fitting recesses 433. Here, the gaps between adjacent support pieces 432 may be formed to be substantially equal to the thicknesses of the filters 100', more specifically, the thicknesses of the frames 120b.

In this case, the plurality of support pieces 432 may be disposed on one surface of the connection bar 431 to be spaced apart from each other at regular gaps along the longitudinal direction. Accordingly, when the respective filters 100' are inserted into the fitting recesses 433, the plurality of filters 100' arranged in parallel to each other may be spaced apart from each other at equal gaps.

Here, both end portions of the fitting members 430 may be fixed to or in simple contact with the fixing frame 410. In addition, a single fitting member or a plurality of the fitting members 430 may be used.

The filter module 400 may also be applied in place of the above-described filter module of the wastewater treatment system. In this case, process of producing filtered water by providing suction force using the pump and the process of removing contaminants adhered to the filtration member are the same as above, detailed descriptions thereof will be omitted.

Although exemplary embodiments of the present disclosure have been described, the exemplary embodiments described in the specification are intended to not limit the technical spirit of the present disclosure, and a person having ordinary skill in the art who understands the spirit of the present disclosure should appreciate that another embodiment may be easily suggested by additions, modifications, deletions, supplements, and the like, made within the scope of the same spirit, and the other embodiments may also be included within the scope and sprit of the present disclosure.

What is claimed is:

1. A filter module for water treatment, comprising:
a filter assembly including a plurality of filters, integrated through a fastening bar; and at least one collecting member connected in one-to-one relationship to water-receiving portions provided in the plurality of filters to collect filtered water discharged from the plurality of filters, wherein each of the plurality of filters comprises:
a plate-shaped filtration member having a predetermined area;
a support frame coupled to peripheral portions of the filtration member to support the filtration member, the support frame having channels through which filtered water produced by the filtration member flows; and
a gap adjustment member coupled to the support frame so as to space the filtration member and an adjacent filtration member from each other, the gap adjustment member including
a body into which a corner of the support frame is inserted, and
a gap adjusting portion including a fastening hole through which the fastening bar having a predetermined length passes, wherein the support frame comprises a plurality of frames coupled to the peripheral portions of the filtration member, and wherein each of the plurality of frames includes a first plate, a pair of second plates extending from both ends of the first plate such that the peripheral portions of the filtration member are inserted, and a stopper provided on opposite surfaces of the pair of the second plates to limit an insertion depth by which the filtration member is inserted.

2. The filter module of claim 1, wherein the collecting member comprises:
   a main body storing the filtered water introduced from the water-receiving portions;
   a plurality of inlets configured to introduce the filtered water discharged from the water-receiving portions into the main body; and
   at least one outlet configured to discharge the filtered water from the main body.

3. The filter module of claim 2, wherein the collecting member is spaced apart from the water-receiving portions of the plurality of the filters at predetermined gaps, and the plurality of inlets are connected in one-to-one relationship to the respective water-receiving portions through tubes.

4. The filter module of claim 2, wherein the water-receiving portions of the plurality of filters are directly inserted into the inlets of the collecting member.

5. The filter module of claim 1, wherein the gap adjusting member includes a water-receiving portion configured to discharge the filtered water introduced from channels.

6. The filter module of claim 1, wherein the gap adjusting portion includes:
   an extension plate extending from the body, and having the fastening hole; and
   a spacing member protruding at a predetermined height around the fastening hole so as to space the filtration member and an adjacent filtration member from each other.

7. The filter module of claim 1, wherein the plurality of frames are disposed such that one end of one frame among the plurality of frames is in contact with a corresponding end of an adjacent frame among the plurality of frames, and a collection space is provided in a corner of the support frame formed by the adjacent ends, wherein flows of filtered water flowing in different directions through channels join in the collection space, and the collection space communicates with the water-receiving portions configured to discharge the filtered water.

8. The filter module of claim 1, wherein the gap adjustment member is coupled to a corner of the support frame such that both ends of a pair of adjacent frames among the plurality of frames of the support frame is fixed.

9. The filter module of claim 1, wherein the filtration member includes:
   a plate-shape first backing; and
   a nanofiber web made of nanofiber, disposed on the first backing.

10. The filter module of claim 9, wherein the nanofiber web is attached to one surface of the first backing by thermal fusion through a second backing.

11. The filter module of claim 10, wherein the nanofiber web has a melting temperature higher than a process temperature of a thermal fusion, and the second backing has a lower melting temperature than the process temperature of the thermal fusion.

12. The filter module of claim 10, wherein each of the first backing and the second backing is a woven fabric or a nonwoven fabric.

13. The filter module of claim 10, wherein the first backing and the second backing are made of a same material.

14. The filter module of claim 10, wherein a thickness of the second backing is smaller than a thickness of the first backing.

* * * * *